US010701854B2

(12) United States Patent
Gutknecht (10) Patent No.: US 10,701,854 B2
(45) Date of Patent: Jul. 7, 2020

(54) AGRICULTURAL IMPLEMENT WITH ROW UNIT LEVELING SYSTEM (71) Applicant: CNH Industrial America LLC, New Holland, PA (US)

(72) Inventor: Brett Gutknecht, Cedar Falls, IA (US)

(73) Assignee: CNH Industrial America LLC, New Holland, PA (US)

( * ) Notice: Subject to any disclaimer, the term of this patent is extended or adjusted under 35 U.S.C. 154(b) by 152 days.

(21) Appl. No.: 15/655,225

(22) Filed: Jul. 20, 2017

(65) Prior Publication Data
US 2019/0021211 A1 Jan. 24, 2019

(51) Int. Cl.
*A01B 71/06* (2006.01)
*A01B 63/28* (2006.01)
*A01B 59/00* (2006.01)
*A01B 59/042* (2006.01)
*A01B 63/22* (2006.01)
*A01C 7/20* (2006.01)

(52) U.S. Cl.
CPC .......... *A01B 71/066* (2013.01); *A01B 59/004* (2013.01); *A01B 59/042* (2013.01); *A01B 63/22* (2013.01); *A01B 63/28* (2013.01); *A01C 7/208* (2013.01)

(58) Field of Classification Search
CPC ....... A01B 71/066; A01B 71/06; A01B 71/00; A01B 59/004; A01B 59/002; A01B 59/00; A01B 59/042; A01B 59/04; A01B 63/28; A01B 63/24; A01B 63/22; A01C 7/208
See application file for complete search history.

(56) References Cited

U.S. PATENT DOCUMENTS

| 2,974,734 A | 3/1961 | Kienzle |
| 4,508,178 A | 4/1985 | Cowell et al. |
| 5,339,906 A | 8/1994 | Fox et al. |
| 5,415,586 A | 5/1995 | Hanson et al. |
| 5,535,577 A | 7/1996 | Chmielewski et al. |
| 5,709,271 A | 1/1998 | Bassett |
| 6,640,733 B2 | 11/2003 | Huffmeyer |
| 6,749,035 B2 | 6/2004 | Bundy |

(Continued)

FOREIGN PATENT DOCUMENTS

| DE | 32 35 818 A1 | 3/1984 |
| EP | 2 441 321 A2 | 4/2012 |

*Primary Examiner* — Christopher J. Novosad
(74) *Attorney, Agent, or Firm* — Rebecca L. Henkel; Rickard K. DeMille (57) ABSTRACT

An agricultural implement includes: a center frame defining a travel axis; a tool bar connected to the center frame and extending transversely to the travel axis; a first row unit having a first parallel linkage defining a first linkage angle relative to the tool bar; a first angle sensor associated with the tool bar and the first parallel linkage and configured to output a first linkage angle signal corresponding to the first linkage angle; an actuator linked to the first row unit and configured to adjust the first linkage angle; and a controller operationally coupled to the first angle sensor and the actuator. The controller is configured to: determine the first linkage angle; compare the first linkage angle to a preset linkage angle; and activate the actuator to adjust the first linkage angle to the preset linkage angle if the first linkage angle deviates from the preset linkage angle.

7 Claims, 6 Drawing Sheets

(56) References Cited

U.S. PATENT DOCUMENTS

| | | |
|---|---|---|
| 6,813,873 B2 | 11/2004 | Allwörden et al. |
| 8,544,397 B2 | 10/2013 | Bassett |
| 9,232,687 B2 | 1/2016 | Bassett |
| 9,258,938 B2 | 2/2016 | Prickel et al. |
| 9,258,939 B2 | 2/2016 | Borgmann et al. |
| 9,554,504 B2 | 1/2017 | Houck |
| 2015/0033692 A1 | 2/2015 | Schroeder et al. |
| 2015/0230391 A1* | 8/2015 | Houck .................. A01C 7/203 701/50 |
| 2016/0270290 A1 | 9/2016 | Johnson et al. |
| 2017/0118901 A1 | 5/2017 | Stark |

* cited by examiner

AGRICULTURAL IMPLEMENT WITH ROW UNIT LEVELING SYSTEM

FIELD OF THE INVENTION

The present invention pertains to an agricultural implement and, more specifically, to an agricultural implement incorporating row units.

BACKGROUND OF THE INVENTION

Agricultural planters are commonly used implements to plant seeds in soil. An agricultural planter can include a chassis that carries one or more storage tanks carrying seed, and chemical applications that are to be applied to the field during the planting operation, a hitch mechanism that attaches to a tractor or other implement pulled by a tractor, and a tool bar that row units can be connected to so they are carried by the chassis. The planter can also include a pneumatic system carried by the chassis that supplies pressurized air to transport the seeds or other particulate from the storage tanks to the row units.

Each row unit of the agricultural planter places seeds in the field. Typically, the row units are laterally arranged along a length of the tool bar so that as the planter is pulled across the field, each row unit plants seeds at predefined intervals along the path it is pulled across. To plant seeds, the row units perform four main operations as they are pulled: opening a trench in the soil; placing a seed into the formed trench at appropriate intervals; closing the formed trench to put soil on top of the placed seed; and packing soil on top of the seed to provide desirable soil contact with the placed seed. To open a trench in the soil, a furrowing disc system, which may include an opening disc, cuts into the soil and rotates, dislocating soil as it rotates to form the trench. Once the trench is open, a seed is placed in the trench by a metering device which receives seeds from the main storage tank(s) or a row unit storage tank and typically utilizes a combination of differential air pressure, to select the seed, and gravity to place the seed in the trench at predefined intervals along the pulled path so that adjacent seeds in the row are not too close to one another. One or more closing discs carried behind the furrowing disc are pressed into the soil and also rotate as the planter is pulled to replace soil dislocated by the furrowing disc in the trench or dislocate adjacent soil into the trench to cover the seed placed in the trench with soil. Finally, a pressing wheel carried behind the closing disc(s) exerts pressure on the soil covering the seed to press the soil down onto the seed and provide good soil contact with the seed. By having multiple row units working in unison as the planter is pulled across a field, many seeds can be effectively planted in an efficient manner.

One issue that can arise during planting is due to the row units all being connected to the tool bar, which may trail the tractor or other vehicle pulling the planter by a significant distance. When the vehicle pulling the planter traverses uneven terrain, such as a hill in the field, the wheels of the vehicle pulling the planter may be at a different elevation than wheels of the row units which are being pulled along with the tool bar. This difference in elevations can lead to the center frame of the planter being angled with respect to the ground plane on which the row units are traveling, which can cause the row units to either dig into the ground or be pulled away from the ground as the planter is being towed. When the row units are either digging into or being pulled away from the ground, this detrimentally impacts the row units' ability to provide uniform seed depth and spacing, compact seed trenches effectively, and close the formed trenches; further, the pressing wheels may also experience accelerated wear.

What is needed in the art is an agricultural implement which can overcome some of the previously described issues associated with known agricultural implements.

SUMMARY OF THE INVENTION

In exemplary embodiments of the present invention, an agricultural implement is provided which can adjust a linkage angle of a parallel linkage of a row unit when the linkage angle of the parallel linkage, relative to a tool bar of the implement, deviates from a preset linkage angle.

In another exemplary embodiment provided in accordance with the present invention, there is provided an agricultural implement including: a center frame defining a travel axis; a tool bar connected to the center frame and extending transversely to the travel axis; a plurality of row units each including a parallel linkage pivotably coupled to the tool bar, the plurality of row units including a first row unit having a first parallel linkage defining a first linkage angle relative to the tool bar; at least one angle sensor including a first angle sensor associated with the tool bar and the first parallel linkage and configured to output a first linkage angle signal corresponding to the first linkage angle; an actuator linked to the first row unit and configured to adjust the first linkage angle; and a controller operationally coupled to the first angle sensor and the actuator. The controller is configured to: determine the first linkage angle from the first linkage angle signal; compare the first linkage angle to a preset linkage angle; and activate the actuator to adjust the first linkage angle to the preset linkage angle if the first linkage angle deviates from the preset linkage angle.

In yet another exemplary embodiment provided in accordance with the present invention, there is provided an agricultural implement including: a center frame defining a travel axis; a tool bar connected to the center frame and extending transversely to the travel axis; a plurality of row units each including a parallel linkage pivotably coupled to the tool bar, the plurality of row units including a first row unit having a first parallel linkage defining a first linkage angle relative to the tool bar; at least one angle sensor including a first angle sensor associated with the tool bar and the first parallel linkage and configured to output a first deviation signal upon the first linkage angle deviating from a preset linkage angle; an actuator linked to the first row unit and configured to adjust the first linkage angle; and a controller operationally coupled to the first angle sensor and the actuator, the controller being configured to activate the actuator to adjust the first linkage angle to the preset linkage angle upon detecting the first deviation signal.

In yet another exemplary embodiment provided in accordance with the present invention, there is provided a method of controlling an agricultural implement including a center frame defining a travel axis, a tool bar connected to the center frame and extending transversely to the travel axis; and a plurality of row units each including a parallel linkage pivotably coupled to the tool bar, the plurality of row units including a first row unit having a first parallel linkage defining a first linkage angle relative to the tool bar, the method including: determining the first linkage angle deviates from a preset linkage angle; and activating an actuator linked to the first row unit to adjust the first linkage angle to the preset linkage angle responsively to determining the first linkage angle deviates from the preset linkage angle.

One possible advantage of exemplary embodiments provided in accordance with the present invention is that the agricultural implement can adjust for deviations in the linkage angles of the parallel linkages, which correlate with the angle of the row units relative to the ground plane.

Another possible advantage of exemplary embodiments provided in accordance with the present invention is the deviations in the linkage angles of the parallel linkages can be determined in a variety of different ways.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown Like numerals indicate like elements throughout the drawings. In the drawings.

DETAILED DESCRIPTION OF THE INVENTION

Figure 1:
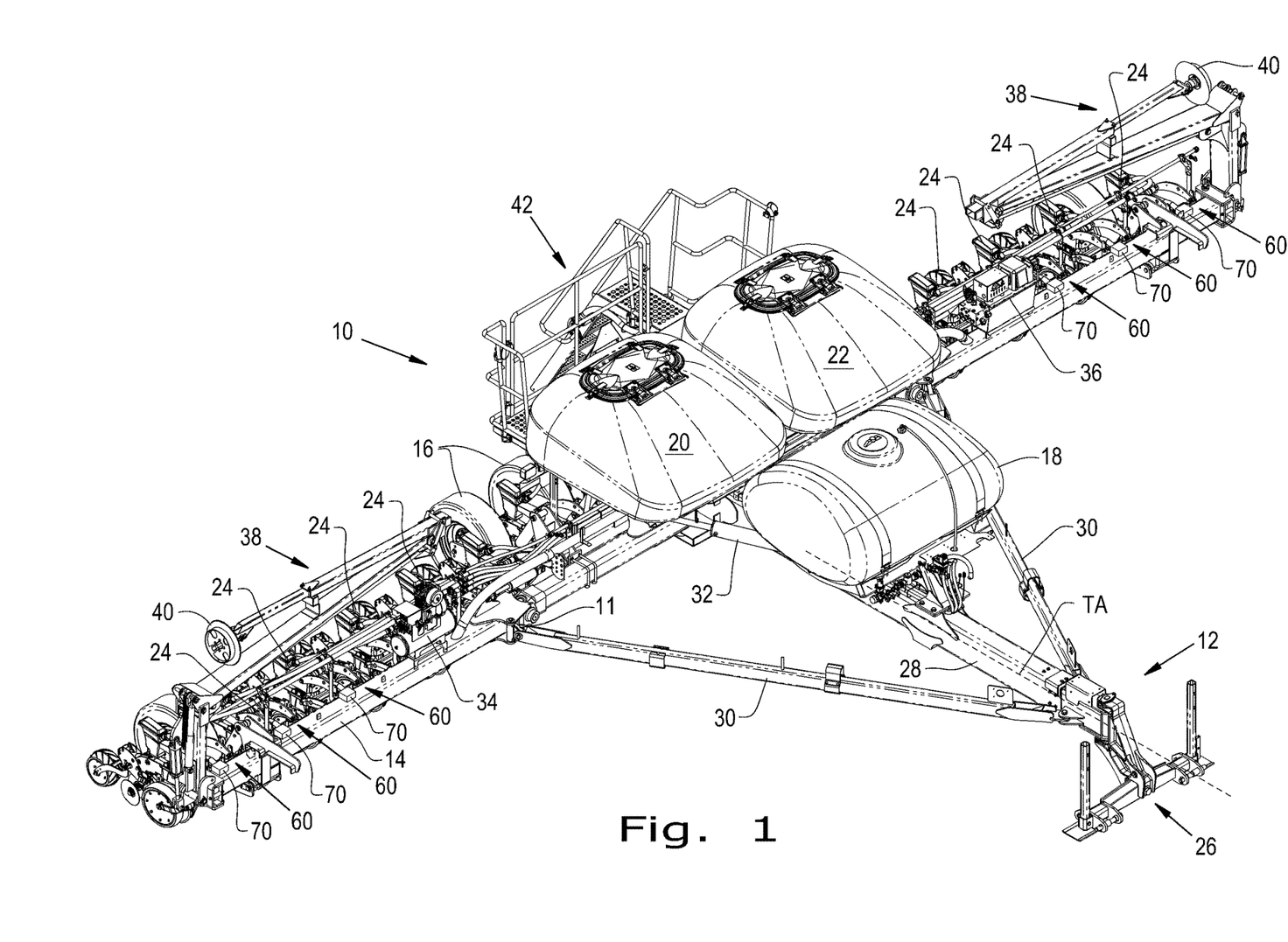
FIG. 1 illustrates a perspective view of an exemplary embodiment of an agricultural implement, the agricultural implement comprising a tool bar and a plurality of row units connected to the tool bar, in accordance with an exemplary embodiment of the present invention.

Referring now to the drawings, and more particularly to FIG. 1, there is shown an exemplary embodiment of an agricultural implement 10, shown in the form of an agricultural planter, formed in accordance with the present invention which generally includes a chassis 11 forming a support structure for components of the planter 10. The planter 10 can include a hitch assembly 12 at a front of the planter 10 connected to a tool bar 14 to form the chassis 11, main wheels 16 carried by the chassis 11 near a rear of the planter 10, one or more storage tanks 18, 20, 22 carried by the chassis 11 that can be filled with seed or other agriculture material, and a plurality of row units 24 connected to the tool bar 14 and arranged laterally across a length of the tool bar 14 so that they are carried by the chassis 11. The hitch assembly 12 can include a hitch 26 configured to be connected to a tractor or other agricultural implement (not shown) so that the planter 10 can be pulled. The hitch 26 can be integrally formed with or connected to a center frame 28 that is connected to the tool bar 14 by bracing bars 30 and one or more actuators 32, shown as a cylinder, and defines a travel axis TA which the planter 10 will tend to travel along while being pulled. The tool bar 14 extends transversely to the travel axis TA, such as orthogonally, so the connected row units 24 can all travel parallel to the travel axis TA as the planter 10 is pulled. As can be seen throughout FIG. 1, the planter 10 can also have various hydraulic, pneumatic, and electrical lines (unnumbered) throughout to support various cylinders and systems that are included on the planter 10, such as a pneumatic system 34 connected to the tool bar 14 and an electric generator 36 also connected to the tool bar 14. A marking device 38 can be connected to each lateral end of the tool bar 14 and extendable so that a marking disc 40 of the marking device 38 can create a line in the soil as the planter 10 is pulled that helps a user in positioning the planter 10 to create subsequent rows. A stair assembly 42 can be mounted to the back of the planter 10 to allow an operator to access the storage tanks 20 and 22. It should be appreciated that the shown and described planter 10 is exemplary only, and many types of modifications can be made to the planter 10 in accordance with the present invention.

Figure 2:
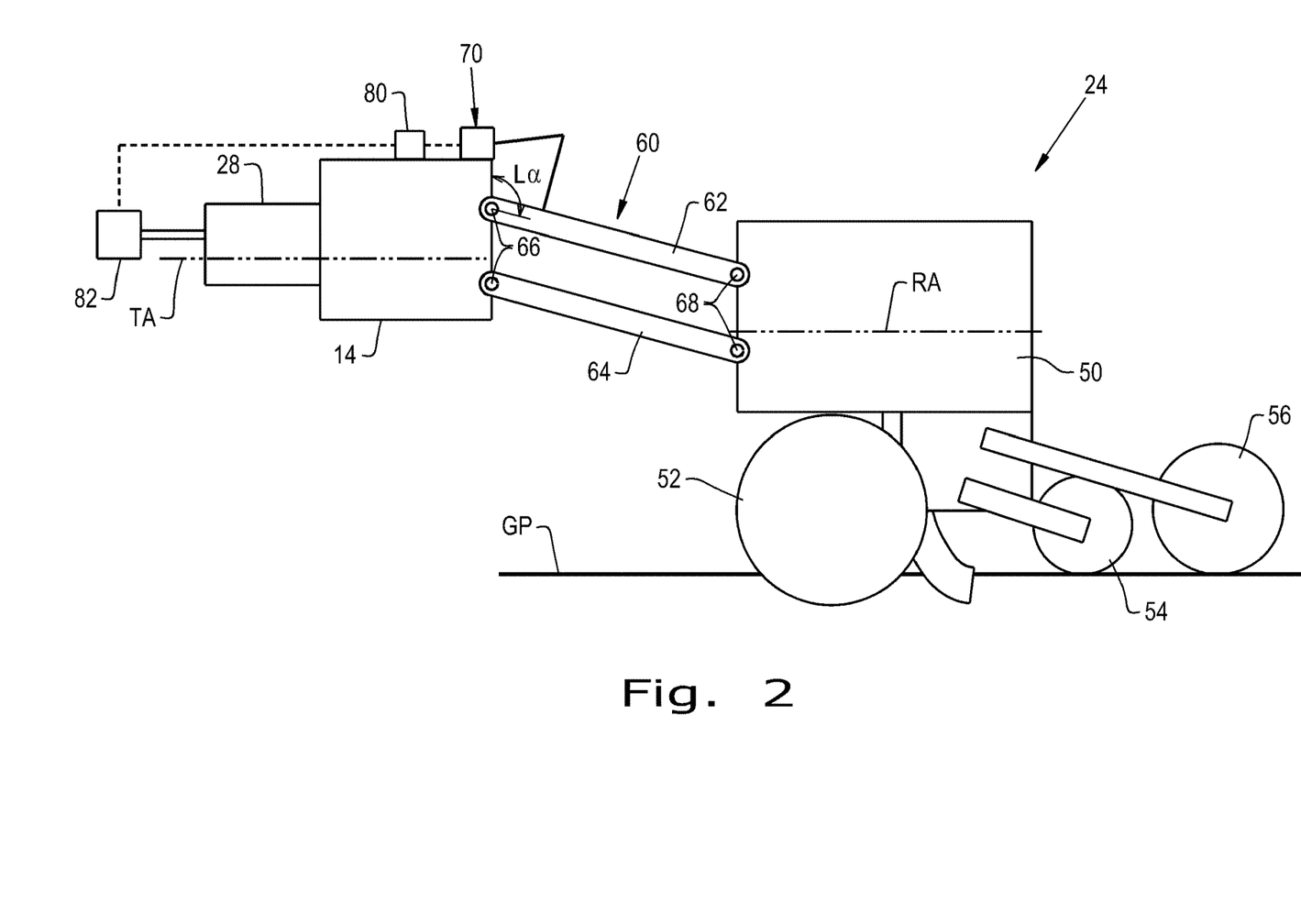
FIG. 2 illustrates a side view of one of the row units of the agricultural implement of FIG. 1 with a parallel linkage having a linkage angle equal to a preset linkage angle, in accordance with an exemplary embodiment of the present invention.

Referring now to FIG. 2, an exemplary embodiment of one of the row units 24 shown in FIG. 1 is shown in greater detail, with the row unit 24 shown in FIG. 2 being referred to further herein as a first row unit 24. As can be seen, the first row unit 24 can include a unit body 50 that can be carried by the tool bar 14 along the travel axis TA, a furrowing disc 52 connected to the unit body 50, one or more closing discs 54 connected to the unit body 50, and a pressing wheel 56 connected to the unit body 50. It should be appreciated that the first row unit 24, and the other row units 24, can include other components, such as a metering unit, as is known, but such features are omitted for ease of description.

As can be further seen in FIG. 2, the first row unit 24 also includes a first parallel linkage 60 including one or more first arms 62 and one or more second arms 64 which are connected to the unit body 50 of the first row unit 24 and the tool bar 14 so the tool bar 14 can pull the first row unit 24 while the planter 10 travels along the travel axis TA. It should be appreciated that while the first arm 62 and second arm 64 are shown as being substantially straight in FIG. 2, the arms 62, 64 can also have a curved shape if desired. The first parallel linkage 60 is pivotably connected to the tool bar 14 to allow for pivoting of the unit body 50 and connected components during travel of the planter 10 to reduce the risk of the first row unit 24 snapping off from the tool bar 14. As used herein, the first parallel linkage 60 is "pivotably connected" to the tool bar 14 in the sense that the first parallel linkage 60 is connected to the tool bar 14 such that the first parallel linkage 60 can pivot relative to the tool bar 14, at a first pivot 66 on the tool bar 14 and/or at a second pivot 68 on the unit body 50. Due to the pivotable connection between the first parallel linkage 60 and the tool bar 14, the first parallel linkage 60 defines a first linkage angle $L\alpha$ relative to the tool bar 14 which can change during travel. As shown, the first linkage angle $L\alpha$ can be defined by the first arm 62 relative to the tool bar 14, but it should be appreciated that the linkage angle can also be defined by the second arm 64 relative to the tool bar 14. Further, while only the first row unit 24 and its corresponding first linkage angle $L\alpha$ is shown in FIG. 2, it should be appreciated that all of the row units 24 of the planter 10 can be configured identically and the respective parallel linkage 60 of each row unit 24 connected to the tool bar 14 will define a respective linkage angle relative to the tool bar 14.

To measure the first linkage angle $L\alpha$ defined between the first parallel linkage 60 and the tool bar 14, the planter 10 includes at least one angle sensor, shown as a first angle sensor 70, associated with the tool bar 14 and the first parallel linkage 60. The first angle sensor 70 is "associated with" the tool bar 14 and the first parallel linkage 60 in the sense that the first angle sensor 70 can either directly measure the first linkage angle $L\alpha$ by the positional relationship between the parallel linkage 60 and the tool bar 14 or, alternatively, measure a change in the first linkage angle $L\alpha$ caused by relative pivoting between the parallel linkage 60 and the tool bar 14, as will be described further herein. As shown in FIG. 2, the first angle sensor 70 can be mounted to the tool bar 14 and connected to the first arm 62 of the parallel linkage 60 such that the first angle sensor 70 can be used to detect changes in the first linkage angle $L\alpha$, the significance of which will be described further herein.

In order to compensate for deviations in the first linkage angle $L\alpha$, a controller 80 is operationally coupled to the first angle sensor 70 and an actuator 82, which may be connected to the center frame 28, linked to the first row unit 24 and configured to adjust the first linkage angle $L\alpha$ by, for example, raising and/or lowering the tool bar 14. As used herein, the controller 80 is "operationally coupled" to the first angle sensor 70 and actuator 82 in the sense that the controller 80 can receive signals from the first angle sensor 70 and, based on the received signals, send signals to the actuator 82 in order to selectively activate the actuator 82. The controller 80 may have a wired coupling to the first angle sensor 70 and/or actuator 82 or, alternatively, may be wirelessly coupled to the first angle sensor 70 and/or actuator 82, as is known. Many configurations of controllers are known, so further discussion of the configuration of the controller 80 is omitted for brevity.

As can be seen in FIG. 2, the first row unit 24 defines a row unit axis RA which is substantially parallel to a ground plane GP on which the first row unit 24 is traveling, i.e., the first row unit 24 is travelling parallel with the ground plane GP, at the shown first linkage angle $L\alpha$ between the first arm 62 and the tool bar 14. When the first row unit 24 travels parallel to the ground plane GP, the components of the first row unit 24 can generally function according to their tunable settings, which may be detrimentally affected by angling between the row unit axis RA relative to the ground plane GP causing the components to, for example, dig into the ground. In this respect, the first linkage angle $L\alpha$ shown in FIG. 2 can represent a preset linkage angle which corresponds to the first row unit 24 traveling parallel with the ground plane GP on which the first row unit 24 rests and the controller 80 can be configured to maintain this preset linkage angle, as described further herein. It should be appreciated that the preset linkage angle shown in FIG. 2 is exemplary only, and other preset linkage angles can be chosen according to the present invention.

Figure 3:
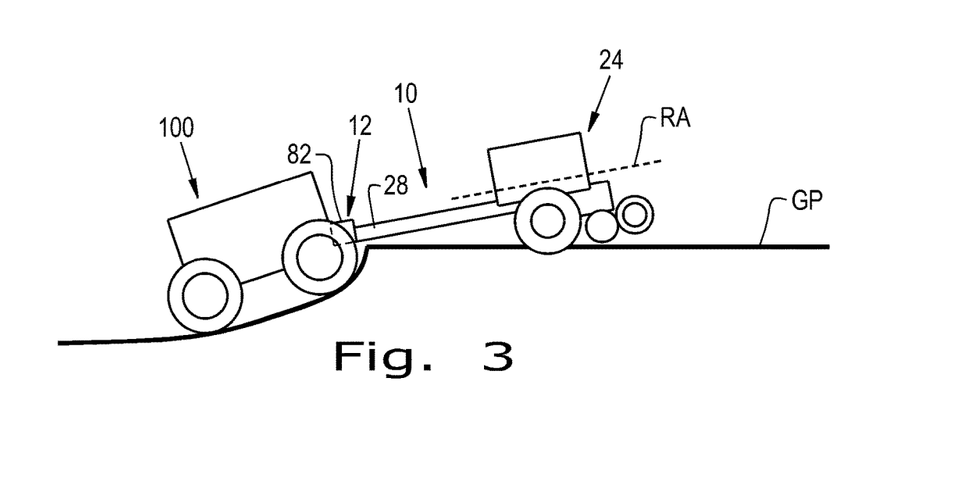
FIG. 3 illustrates a side view of a vehicle towing the agricultural implement of FIG. 1 across uneven terrain such that the vehicle has a relatively lowered elevation.
Figure 4:
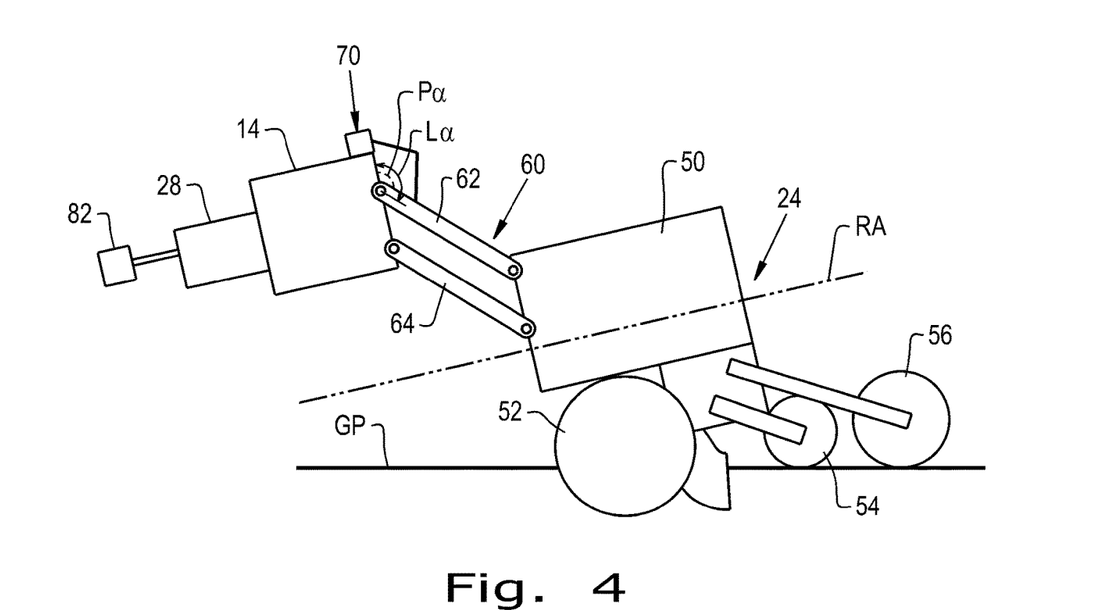
FIG. 4 illustrates a side view of the row unit shown in FIGS. 2-3 with the parallel linkage having a linkage angle which deviates from the preset linkage angle.

Referring now to FIGS. 3-4, the planter 10 is shown being towed by a work vehicle 100, such as a tractor, across an uneven field. Since the hitch assembly 12 of the planter 10 is hooked to the tractor 100 and there is a substantial length between the hitch assembly 12 and tool bar 14 connected to the row units 24, the unevenness of the field causes the center frame 28 and connected tool bar 14 to become angled relative to the ground, rather than parallel, and tend to lift the row units 24. The tendency of the tool bar 14 to lift the row units 24 due to the unevenness of the field causes the first linkage angle $L\alpha$ defined between the first parallel linkage 60 and the tool bar 14 to change, as can be seen in FIG. 4. To better illustrate certain exemplary embodiments of the present, a preset linkage angle $P\alpha$, corresponding to the first linkage angle $L\alpha$ shown in FIG. 2, is illustrated in FIG. 4 in dashed line. As can be seen, the current first linkage angle $L\alpha$ between the parallel linkage 60 and the tool bar 14 deviates from the present linkage angle $P\alpha$. When the current first linkage angle $L\alpha$ deviates from the preset linkage angle $P\alpha$ as shown in FIG. 4, the components of the first row unit 24 can tend to dig into the ground, which may detrimentally affect performance.

Figure 5:
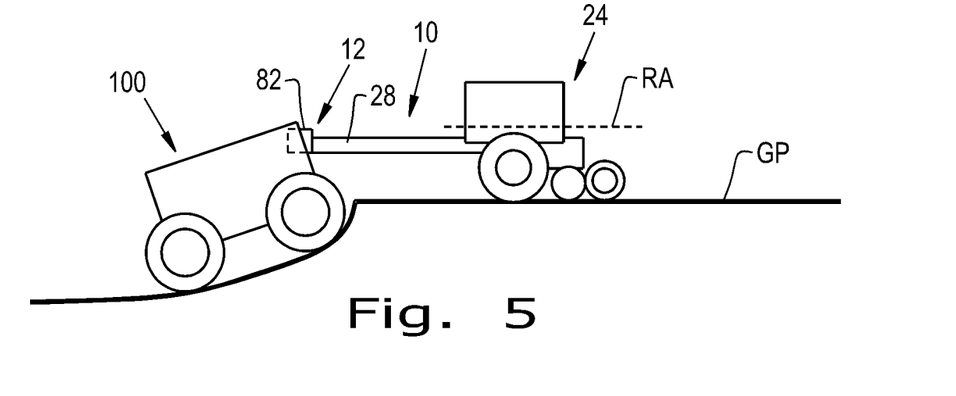
FIG. 5 illustrates a side view of the towed agricultural implement shown in FIGS. 3-4 after an actuator linked to the row unit has adjusted the linkage angle to be equal to the preset linkage angle.

To compensate for the deviation of the current first linkage angle $L\alpha$ shown in FIGS. 3-4 and the preset linkage angle $P\alpha$, and referring now to FIG. 5, the controller 80 is configured to detect the deviation of the current first linkage angle $L\alpha$ from the preset linkage angle $P\alpha$ and responsively activate the actuator 82 to adjust the first linkage angle $L\alpha$ back to the preset linkage angle $P\alpha$. Depending on the configuration of the first angle sensor 70, the controller 80 may be configured to detect the deviation of the first linkage angle $L\alpha$ from the preset linkage angle $P\alpha$ in a variety of ways.

In one exemplary embodiment according to the present invention, the first angle sensor 70 may be configured to output a first linkage angle signal to the controller 80 which directly corresponds to the first linkage angle $L\alpha$ defined between the parallel linkage 60 and the tool bar 14. The first linkage angle signal may, for example, be a signal with a certain amplitude or frequency which directly or inversely correlates with the first linkage angle $L\alpha$ detected by the first angle sensor 70. The controller 80, upon receiving the first linkage angle signal, may then determine the first linkage angle $L\alpha$ from the received first linkage angle signal and compare the determined first linkage angle $L\alpha$ to the preset linkage angle $P\alpha$. If the controller 80 determines the first linkage angle $L\alpha$ deviates from the preset linkage angle $P\alpha$ following the comparison, the controller 80 can then appropriately activate the actuator 82 to adjust the first linkage angle $L\alpha$ back to the preset linkage angle $P\alpha$, as shown in FIG. 5. The preset linkage angle $P\alpha$ may, in some exemplary embodiments, be pre-programmed into the controller 80. In other exemplary embodiments, the controller 80 can be configured to receive a preset linkage angle signal corresponding to the preset linkage angle $P\alpha$ from a user input, such as a touchscreen (not shown) coupled to the controller 80, allowing the user to adjust the preset linkage angle $P\alpha$ as desired.

In another exemplary embodiment according the present invention, the first angle sensor 70 may have a normal resting position corresponding to the first linkage angle $L\alpha$ of the parallel linkage 60 being the preset linkage angle $P\alpha$ and be configured to output a first deviation signal to the controller 80 upon the first linkage angle $L\alpha$ deviating from the preset linkage angle $P\alpha$. Upon detecting the first deviation signal from the first angle sensor 70, the controller 80 may then activate the actuator 82 to adjust the first linkage angle $L\alpha$ to the preset linkage angle $P\alpha$. To determine how the actuator 82 should be activated to adjust the first linkage angle $L\alpha$ to the preset linkage angle $P\alpha$, the first angle sensor 70 may be configured to output a first deviation signal which is either positive or negative corresponding to the direction of the deviation, with the magnitude of the first deviation signal corresponding to the degree of deviation of the first linkage angle Lα from the preset linkage angle Pα. It should be appreciated that the foregoing examples are exemplary only, and other configurations of the first angle sensor 70 can be utilized in exemplary embodiments formed according to the present invention.

It should be appreciated from the foregoing exemplary embodiments that it is not critical how the controller 80 determines that the current linkage angle Lα of the parallel linkage 60 relative to the tool bar 14 deviates from the preset linkage angle Pα. Therefore, it should be further appreciated that other suitable configurations and methods can be utilized to determine the current linkage angle Lα of the parallel linkage 60 relative to the tool bar 14 deviates from the preset linkage angle Pα in accordance with exemplary embodiments of the present invention.

To adjust the current first linkage angle Lα of the first parallel linkage 60, the actuator 82 may be, for example, connected to and/or carried by the tractor 100 and connected to the center frame 28 via the hitch 26, i.e., the actuator 82 may be a hitch actuator which is used to raise and lower the hitch 26 as is known. As shown in FIG. 5, the controller 80, upon detecting the current first linkage angle Lα deviates from the preset linkage angle Pα, can selectively activate the actuator 82 to raise the center frame 28 and connected tool bar 14 to the position shown in FIG. 5 so the tool bar 14 is once again parallel to the ground plane GP and the current first linkage angle Lα returns to the preset linkage angle Pα so the first row unit 24 is parallel to the ground plane GP as well. Activating the actuator 82 to raise the tool bar 14, as shown, will also cause all row units 24 connected to the tool bar 14 to be raised, allowing the actuator 82 to adjust the respective linkage angle Lα of each row unit 24 connected to the tool bar 14 simultaneously. It should be appreciated that a different actuator, such as the previously described cylinder 32, can also be activated by the controller 80, in addition or alternatively to the actuator 82, to adjust the first linkage angle Lα to the preset linkage angle Pα. The selectively activated actuator may, for example, extend or contract the third link of a three point mounted planter, roll the center frame 28 bar, or act on an additional link introduced into the parallel linkage 60. It should be further appreciated that the configuration and manner of adjusting the first linkage angle Lα with the actuator 82 can be adjusted, as desired, and the foregoing examples are but a few examples of suitable arrangements for adjusting the first linkage angle Lα with the actuator 82.

Figure 6:
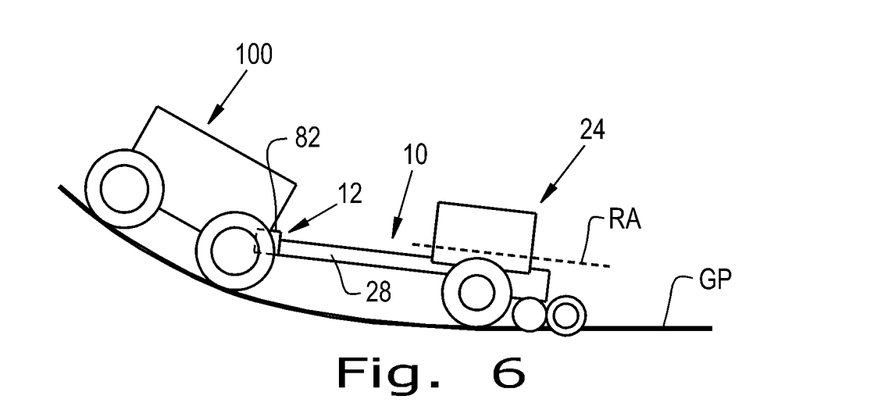
FIG. 6 illustrates a side view of a vehicle towing the agricultural implement of FIG. 1 across uneven terrain such that the vehicle has a relatively raised elevation.
Figure 7:
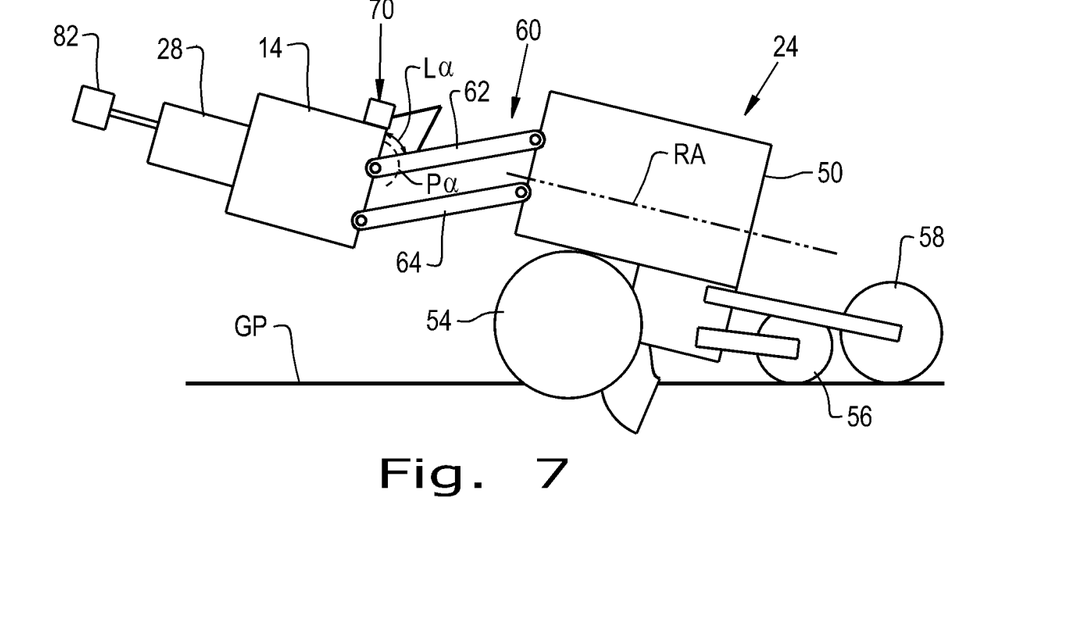
FIG. 7 illustrates a side view of the row unit shown in FIG. 2 with the parallel linkage having a linkage angle which deviates from the preset linkage angle.
Figure 8:
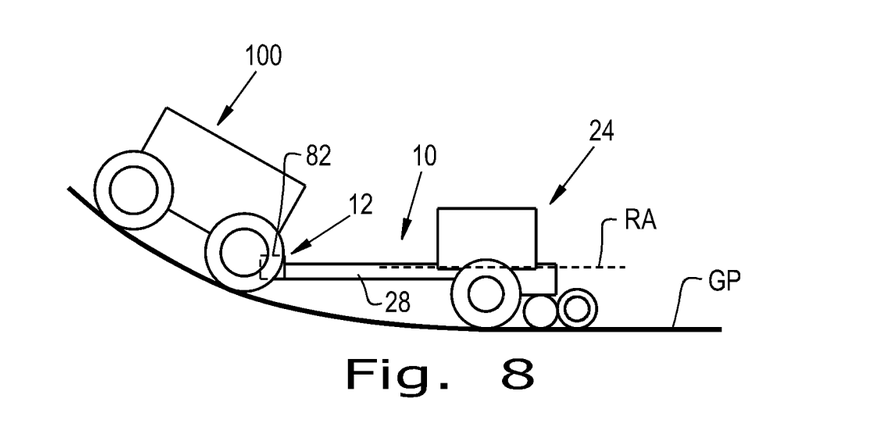
FIG. 8 illustrates a side view of the towed agricultural implement shown in FIGS. 6-7 after an actuator linked to the row unit has adjusted the linkage angle to be equal to the present linkage angle.

Referring now to FIGS. 6-7, the planter 10 is shown being pulled by the tractor 100 as the tractor 100 climbs a hill. As can be seen in FIG. 7, the current first linkage angle Lα deviates from the preset linkage angle Pα, which can be sensed by the first angle sensor 70 and determined by the controller 80. Upon the controller 80 determining that the current first linkage angle Lα deviates from the preset linkage angle Pα, the controller 80 can selectively activate the actuator 82 to lower the tool bar 14 to adjust the first linkage angle Lα to the preset linkage angle Pα, as shown in FIG. 8. It should therefore be appreciated that the controller 80 can be configured to appropriately activate the actuator 82 in a variety of situations where the current first linkage angle Lα deviates from the preset linkage angle Pα in order to adjust the first linkage angle Lα to the preset linkage angle Pα. By configuring the controller 80 to appropriately activate the actuator 82 in different situations, the controller 80 can maintain the first linkage angle Lα at the preset linkage angle Pα so the row units 24 have the desired orientation during travel of the planter 10.

While the foregoing description only describes a single first angle sensor 70 associated with a single parallel linkage 60 and coupled to the controller 80 so the controller 80 can determine when the associated first linkage angle Lα deviates from the preset linkage angle Pα, the controller 80 can be operationally coupled to a plurality of angle sensors 70 (shown in FIG. 1) which are each associated with a respective parallel linkage 60 of a row unit 24 and the tool bar 14, with input from each of the angle sensors 70 being used by the controller 80 to detect when one or more respective linkage angles Lα of the row units 24 deviate from the preset linkage angle Pα. In such a configuration, the controller 80 can be configured to activate the actuator 82 to adjust one or more of the deviating linkage angles to the preset linkage angle Pα. In some exemplary embodiments, the controller 80 can be configured to activate the actuator 82 to adjust the respective linkage angles Lα until each respective linkage angle Lα is equal to the preset linkage angle Pα; in other exemplary embodiments, the controller 80 can be configured to activate the actuator 82 to adjust the respective linkage angles Lα until a majority of the respective linkage angles Lα are equal to the preset linkage angle Pα; in still other exemplary embodiments, the controller 80 can be configured to activate the actuator 82 to adjust the respective linkage angles Lα until a predetermined number of respective linkage angles Lα are equal to the preset linkage Pα. It should therefore be appreciated that the controller 80 can be configured in many different ways to maintain one or more of the respective linkage angles Lα of the row units 24 at the preset linkage angle Pα according to the present invention.

Figure 9:
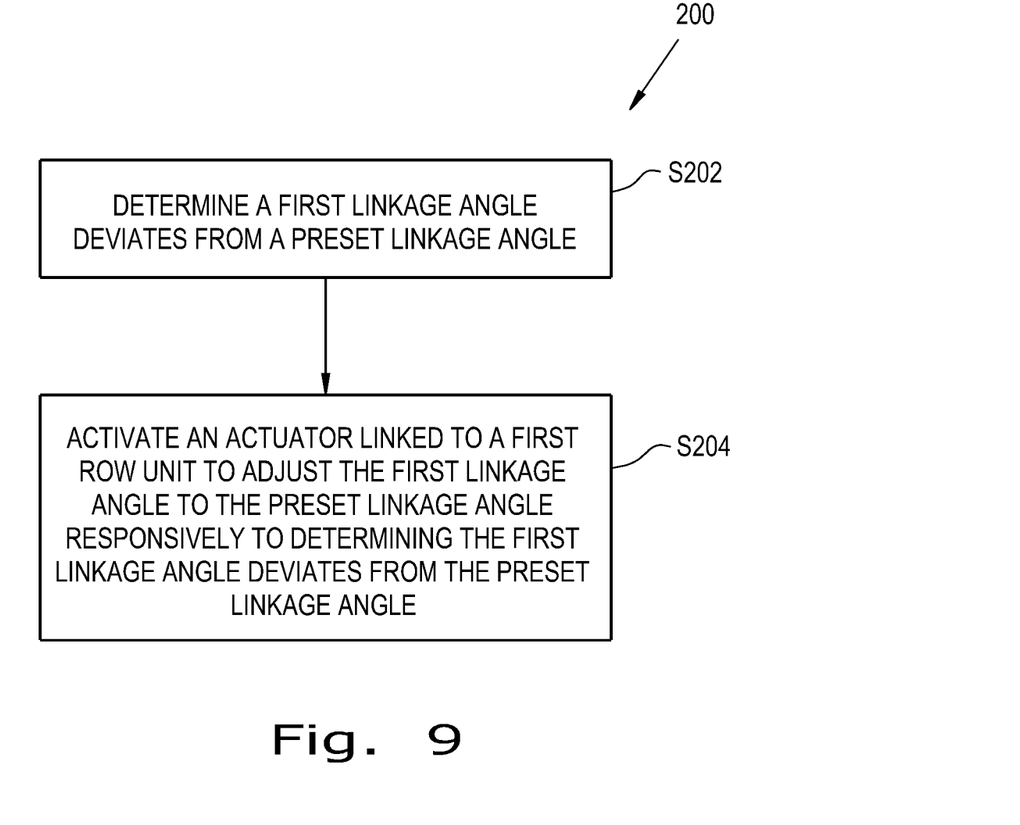
FIG. 9 illustrates a flow chart of an exemplary embodiment of a method provided according to the present invention.

Referring now to FIG. 9, an exemplary embodiment of a method 200 provided in accordance with the present invention is shown for controlling an agricultural implement 10. The method 200 includes determining S202 a first linkage angle Lα deviates from a preset linkage angle Pα. The actuator 82 linked to the first row unit 24 can be activated S204 to adjust the first linkage angle Lα to the preset linkage angle Pα responsively to determining S202 the first linkage angle Lα deviates from the preset linkage angle Pα. The determining S202 and activating S204 can be performed by, for example, the previously described controller 80. To determine S202 the first linkage angle Lα deviates from the preset linkage angle Pα, the controller 80 can be operationally coupled to a first angle sensor 70 associated with the tool bar 14 and the first parallel linkage 60 which is configured to output a first linkage angle signal corresponding to the first linkage angle Lα. The determining S202 can include comparing the first linkage angle signal to a preset linkage angle signal corresponding to the preset linkage angle Pα. In another exemplary embodiment, the controller 80 can be operationally coupled to a first angle sensor 70 associated with the tool bar 14 and the first parallel linkage 60 which is configured to output a first deviation signal upon the first linkage angle Lα deviating from the preset linkage angle Pα. The controller 80 can then activate the actuator 82 responsively to the first deviation signal being output. To adjust the first linkage angle Lα to the preset linkage angle Pα, the actuator 82 can lift and/or lower the tool bar 14, as shown in FIGS. 3-8. The preset linkage angle Pα may, for example, correspond to the first row unit 24 traveling parallel with the ground plane GP on which the first row unit 24 rests, as previously described.

It is to be understood that the method 200 can be performed by the controller 80 upon loading and executing software code or instructions which are tangibly stored on tangible computer readable mediums. A memory of the controller 80 may be in the form of a magnetic medium, e.g., a computer hard drive, an optical medium, e.g., an optical disc, solid-state memory, e.g., flash memory, or other storage media known in the art. Thus, any of the functionality performed by the controller 80 described herein, such as the method 200, is implemented in software code or instructions which are tangibly stored on a tangible computer readable medium. Upon loading and executing such software code or instructions by the controller 80, the controller 80 may perform any of the functionality of the controller 80 described herein, including any parts of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. An agricultural implement, comprising:
   a center frame defining a travel axis;
   a tool bar connected to the center frame and extending transversely to the travel axis;
   a plurality of row units each including a parallel linkage pivotably coupled to the tool bar, the plurality of row units comprising a first row unit having a first parallel linkage including an upper first parallel linkage arm and a lower second parallel linkage arm, the first parallel linkage arm defining a first linkage angle relative to the tool bar;
   at least one angle sensor comprising a first angle sensor positioned on an upper surface of the tool bar above the first parallel linkage arm connected to the tool bar, the at least one angle sensor configured to output a first linkage angle signal corresponding to the first linkage angle;
   an actuator operatively connected to a tractor and positioned between the tractor and a portion of the center frame of the agricultural implement, the actuator configured to adjust the first linkage angle; and
   a controller operationally coupled to the first angle sensor and the actuator, the controller being configured to:
     determine the first linkage angle from the first linkage angle signal;
     compare the first linkage angle to a preset linkage angle; and
     activate the actuator to adjust the first linkage angle to the preset linkage angle if the first linkage angle deviates from the preset linkage angle,
   wherein the actuator is configured to at least one of raise and lower the tool bar to adjust the first linkage angle.

2. The agricultural implement of claim 1, wherein each parallel linkage of the plurality of row units defines a respective linkage angle relative to the tool bar and the actuator is configured to adjust a plurality of the respective linkage angles simultaneously upon activation.

3. The agricultural implement of claim 1, wherein the controller is configured to receive a preset linkage angle signal corresponding to the preset linkage angle.

4. The agricultural implement of claim 1, wherein the preset linkage angle corresponds to the first row unit traveling parallel with a ground plane on which the first row unit rests.

5. An agricultural implement, comprising:
   a center frame defining a travel axis;
   a tool bar connected to the center frame and extending transversely to the travel axis;
   a plurality of row units each including a parallel linkage pivotably coupled to the tool bar, the plurality of row units comprising a first row unit having a first parallel linkage defining a first linkage angle relative to the tool bar;
   at least one angle sensor comprising a first angle sensor positioned on an upper surface of the tool bar above an upper portion of the parallel linkage connected to the tool bar, the at least one angle sensor configured to output a first deviation signal upon the first linkage angle deviating from a preset linkage angle;
   an actuator operatively connected to a tractor and positioned between the tractor and a portion of the center frame of the agricultural implement, the actuator configured to adjust the first linkage angle; and
   a controller operationally coupled to the first angle sensor and the actuator, the controller being configured to activate the actuator to adjust the first linkage angle to the preset linkage angle upon detecting the first deviation signal,
   wherein the actuator is configured to at least one of raise and lower the tool bar to adjust the first linkage angle.

6. The agricultural implement of claim 5, wherein each parallel linkage of the plurality of row units defines a respective linkage angle relative to the tool bar and the actuator is configured to adjust a plurality of the respective linkage angles simultaneously upon activation.

7. The agricultural implement of claim 5, wherein the preset linkage angle corresponds to the first row unit traveling parallel with a ground plane on which the first row unit rests.

* * * * *